No. 661,174. Patented Nov. 6, 1900.
J. H. GOSS.
INFLATION VALVE ATTACHMENT.
(Application filed July 2, 1900.)
(No Model.)
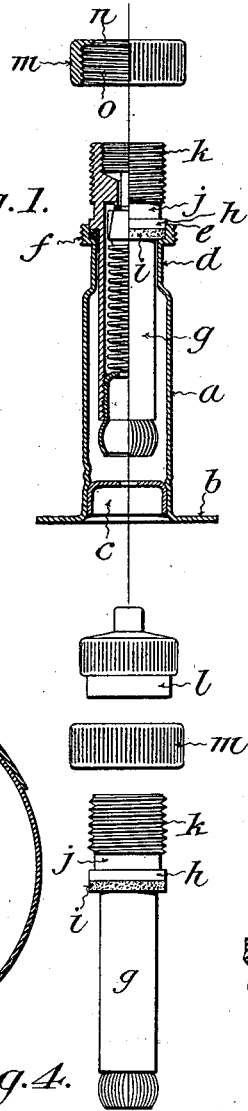
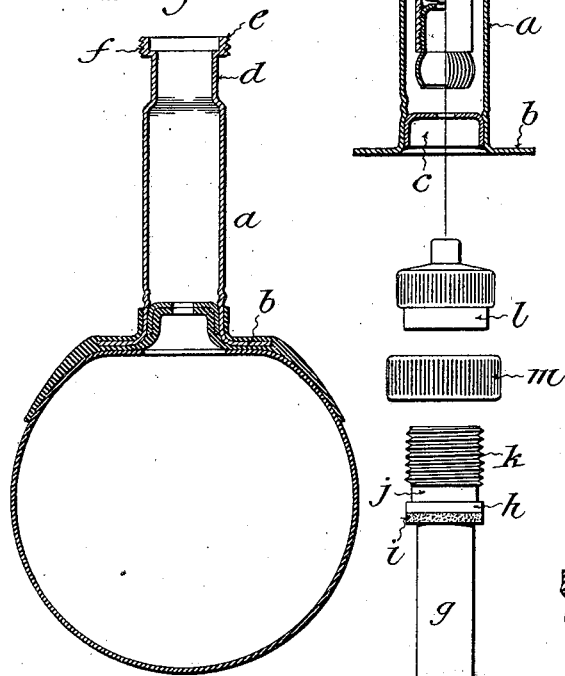
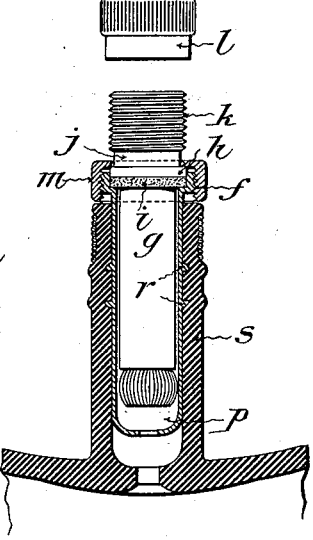
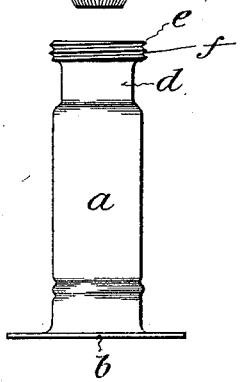
Witnesses:
Inventor.
John H. Goss
by Wm H. Kinsel
Atty
THE NORRIS PETERS CO., PHOTO-LITHO., WASHINGTON, D. C.

UNITED STATES PATENT OFFICE.

JOHN H. GOSS, OF WATERBURY, CONNECTICUT, ASSIGNOR TO THE SCOVILL MANUFACTURING COMPANY, OF SAME PLACE.

INFLATION-VALVE ATTACHMENT.

SPECIFICATION forming part of Letters Patent No. 661,174, dated November 6, 1900.

Application filed July 2, 1900. Serial No. 22,332. (No model.)

*To all whom it may concern:*

Be it known that I, JOHN H. GOSS, a citizen of the United States, residing at Waterbury, in the county of New Haven and State of Connecticut, have invented a certain new and useful Improvement in Inflation-Valve Attachments, of which the following is a full, clear, and exact description.

This invention relates to that class of attachments for applying an inflation-valve to a pneumatic device, such as a wheel-tire, in which the valve itself is entirely independent structurally from the device by which it is attached to the tire or other object and so that the attachment being once in place the valve itself may be applied and removed at pleasure without disturbing the attaching device with relation to the tire or other object.

Heretofore in the class of attachments referred to the connection of the valve with the attaching device has been effected by means of complemental screw-threads upon the interior of the attachment and upon the exterior of the valve-casing; but it is desirable for many reasons, both manufacturing and operative, to dispense with this internal or concealed screw-threaded connection and to substitute for it an external and visible connection, so that the user may more readily perceive the connecting parts, and thus be able to detach and replace the valve whenever necessary.

In carrying out my invention I use a flanged metal tube which is to be permanently fixed to or vulcanized in the inflation-tube of an inner or double tube tire in accordance with prior inventions, or I may employ a flangeless tube which is wired in the cot of a single-tube tire or other object in each instance, and I form an external screw-thread on this tube. The threaded end of the valve which receives the cap has an undercut portion and a subjacent collar or lateral flange. A nut having two screw-threaded diameters is applied to the valve-casing and is adapted to engage the external screw-thread of the tube to effect the union of the valve-casing with the tube in such a manner as to render the valve and its casing readily detachable, all as I will proceed now more particularly to set forth and finally claim.

In the accompanying drawings, illustrating my invention, in the several figures of which like parts are similarly designated, Figure 1 shows the attaching-tube in longitudinal section and the valve and its connecting-nut in half-section and elevation. Fig. 2 is a vertical section illustrating the application of my attachment to the inner or air tube of a double-tube tire. Fig. 3 is a vertical section illustrating the application of my attachment to a single-tube tire, the valve itself being in elevation and its cap detached. Fig. 4 is an elevation of the various parts of the attachment detached.

The tube $a$, if for use on the air-tube or inner tube of a double-tube tire, is provided with a flange $b$, which is secured or vulcanized to said tube substantially as indicated in Fig. 2, and may or may not be provided with the bushing $c$ for the exclusion of the plastic material in the process of vulcanization, these features being common to prior inventions; but instead of screw-threading the contracted neck $d$ of this tube $a$, as has heretofore been done, I provide the socket $e$ with an external screw-thread $f$.

$g$ is a valve-casing of approved construction; but instead of providing it with an external screw-thread complemental to the internal screw-thread of the tube $a$, as heretofore, I omit such external screw-thread and provide the casing with a collar or flange $h$, which has on one side the packing-ring $i$, by which it is seated within the socket $e$, and on the other side it is made with an undercut plain portion $j$, and above the latter is the usual external screw-thread $k$ to receive the usual cap $l$. When the valve proper is inserted in the tube $a$, as shown, for instance, in Fig. 1, then the valve and tube are connected in an air-tight manner by means of the packing-ring $i$ and the two-diameter coupling or union or nut $m$, the thread $n$ of which is complemental to the thread $k$ and the thread $o$ of which is complemental to the thread $f$. When this nut is turned down beyond the thread $k$, its flange, which contains the thread $n$, falls into the undercut portion $j$, and thus is to all intents and purposes swiveled to the casing, while its thread $o$ engages the thread $f$. The flange or collar $h$ resists the downward movement of the nut by the engagement therewith of the flange portion of said nut containing the thread $n$, and so any degree of pressure may be placed upon the packing in order to insure an air-tight joint. The nut $m$ is external to the parts and always visible, and thus the user has a guide to indicate to him how he shall get at the valve for removal or repair.

As shown in Fig. 3, the tube attachment $p$ is of prior construction, excepting its adaptation to the present invention, and it differs from the tube $a$ in being flangeless at its lower end and having such lower end turned inwardly, and also in having the external beads $r$ for engagement with the cot $s$ of the tire or other object; but otherwise the construction shown in Fig. 3 is similar to that already described, and corresponding parts are similarly lettered.

By running the nut off of the screw-thread into the plain portion of the casing it will be understood that said nut is not easily lost.

It will be understood that the feature of the invention is the detachable or removable union of the valve-supporting tube and the valve by means of an external coupling, which is easily accessible and always in sight, and the invention is not limited to the particular form or construction of the two-diameter nut or coupling herein specifically shown and described.

Although I have entitled my invention an "inflation-valve attachment," and for the sake of a concrete object so claim it, I wish to be understood as not limiting my invention to its use in connection with a bicycle inflation-valve.

What I claim is—

1. An inflation-valve attachment, comprising a metal tube adapted to be applied to the tire and to receive the valve as a whole, and provided with an outer socketed end having an external screw-thread, and a valve-casing having a nut swiveled thereon and adapted to engage the external screw-thread of the tube, whereby the valve as a whole may be inserted in said tube and removed from it at pleasure without disturbing the said metal tube or its fastening to the tire, substantially as described.

2. The combination with a tube having a socketed mouth which is externally screw-threaded, of a valve-casing, a packing-ring thereon, an external collar or flange above said packing-ring, and a nut applied to said casing above said flange and engaging it and also engaging the external screw-thread of the tube, substantially as described.

3. An inflation-valve casing, having an undercut plain portion below the usual screw-thread which receives the cap, a subjacent collar or flange, and a swivel-nut applied thereto, combined with an attaching-tube having a socket to receive said casing, and provided with an external screw-thread for cooperation with said nut, substantially as described.

4. An inflation-valve attachment, comprising a tube having a socket and an external screw-thread thereon, a valve-casing having the usual cap-receiving external screw-thread, a plain undercut portion next to such screw-thread, a subjacent collar or flange, a packing-ring beneath said collar or flange, and a nut swiveled on said plain portion and adapted to engage the screw-thread on the socket, substantially as described.

In testimony whereof I have hereunto set my hand this 29th day of June, A. D. 1900.

JOHN H. GOSS.

Witnesses:
M. L. SPERRY,
C. M. DE MOTT.